United States Patent [19]

Maier

[11] 4,083,248
[45] Apr. 11, 1978

[54] DIGITAL LIQUID-LEVEL GAUGING SYSTEMS

[75] Inventor: Lawrence C. Maier, Middlebury, Vt.

[73] Assignee: Simmonds Precision Products, Inc., Tarrytown, N.Y.

[21] Appl. No.: 754,061

[22] Filed: Dec. 23, 1976

Related U.S. Application Data

[63] Continuation of Ser. No. 610,401, Sep. 4, 1975, abandoned.

[51] Int. Cl.$^2$ ............................................. G01F 23/26
[52] U.S. Cl. ................................................. 73/304 C
[58] Field of Search ................ 73/304 C; 324/61 R; 340/347 M; 235/92 MT; 317/246

[56] References Cited

U.S. PATENT DOCUMENTS

| 3,375,716 | 4/1968 | Hersch | 73/304 C |
| 3,552,209 | 1/1971 | Johnston | 73/304 R |

*Primary Examiner*—Donald O. Woodiel
*Attorney, Agent, or Firm*—Edwin E. Greigg

[57] ABSTRACT

A liquid-level gauging system comprises a capacitive probe arranged in a liquid storage tank and electrically connected into timing circuitry of a pulse generator to render the period of the pulse output produced by the generator directly proportional to the probe capacitance and thus proportional to the level of liquid in the tank. The generator pulse output is used to gate a counter receiving pulses from an oscillator whereby, for each cycle of the generator output, an accumulated count is produced in the counter which is proportional to the cycle period. This count is a proportionate measure of the liquid level. The count can be used as an address code for a read-only memory such that the memory output is the number stored in the memory at the address represented by the count value. Suitable programming of the memory can thus give any desired relation between count value and memory output and therefore any desired relation between memory output and tank liquid level.

11 Claims, 1 Drawing Figure

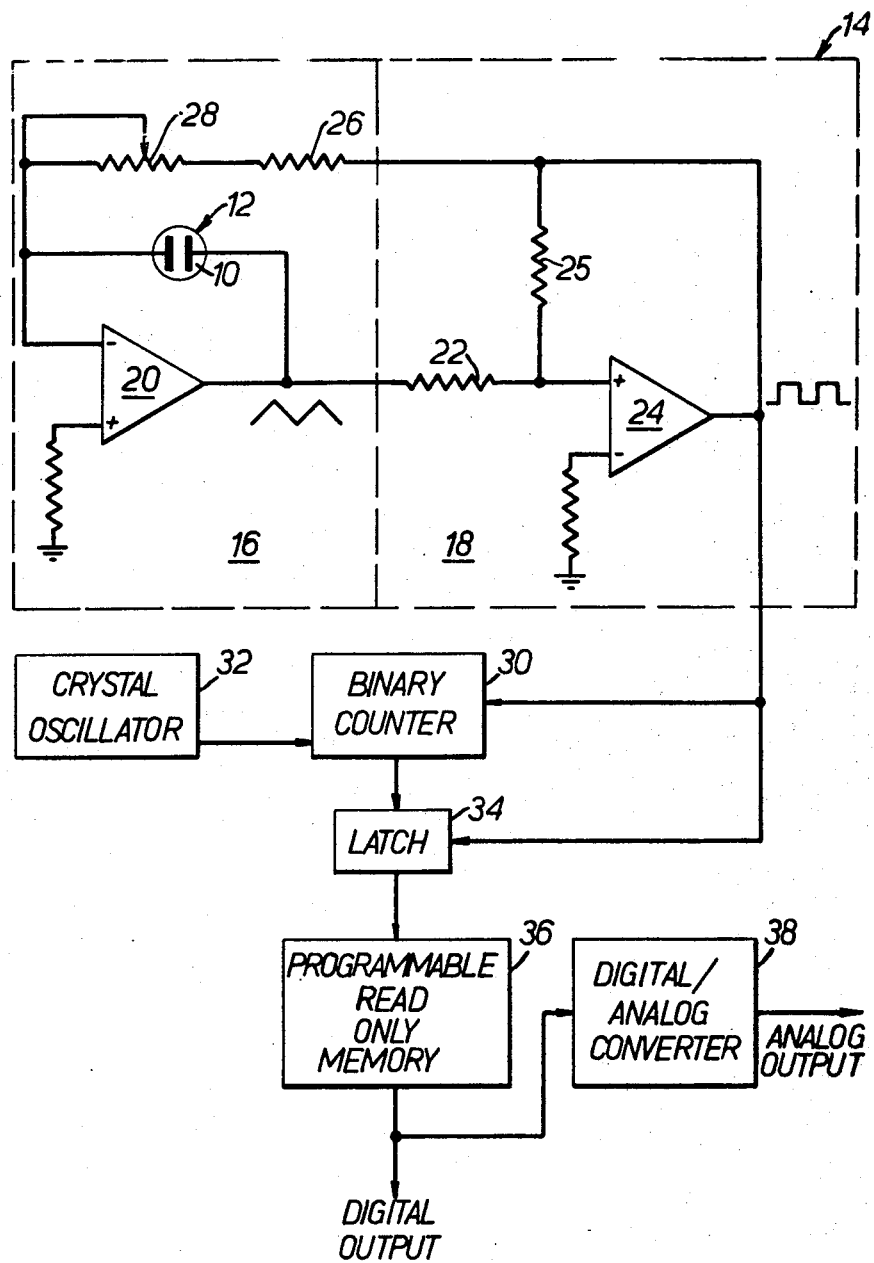

DIGITAL LIQUID-LEVEL GAUGING SYSTEMS

This is a continuation of application Ser. No. 610,401, filed Sept. 4, 1975, now abandoned.

BACKGROUND OF THE INVENTION

1. Field of the Invention

This invention relates to a gauging system for measuring the level of a liquid in a tank using a capacitive probe.

2. Description of the Prior Art

Previously proposed capacitive gauging systems utilize a low impedance oscillator to drive a current through a capacitive probe, the magnitude of the current being proportional to the probe capacitance. This current is then amplified, converted to an A.C. voltage in a precision pre-amplifier, and then further converted in a precision A.C./D.C. converter into a D.C. voltage. Any required linearization is effected by extensive analog circuitry. A precision capacitor is used to nullify the capacitance of the probe corresponding to an empty liquid storage tank.

Such a gauging system using analog processing suffers from several disadvantages including the risk of large temperature-dependent errors in the analog circuitry and the generally high cost of precision analog components.

It is therefore an object of the invention to provide an improved liquid-level gauging system which requires fewer precision components and has a high degree of accuracy.

SUMMARY OF THE INVENTION

The object of the invention is achieved by providing digital processing of the capacitive probe output.

According to the invention there is provided a digital liquid-level gauging system, comprising a capacitive probe for insertion in a liquid storage tank and having a capacitance variable in dependence on the level of liquid in the tank, a variable frequency generator including timing circuitry into which the probe is connected, the capacitance of the probe determining the period of each cycle of the generator output, and means connected to receive said output from the variable frequency generator to produce a digital number directly proportional to the period of the generator output, said digital number being a proportionate measure of the level of liquid in the tank.

According to the invention there is also provided a digital liquid-level gauging system, comprising a capacitive probe for insertion in a liquid storage tank and having a capacitance variable in dependence on the level of liquid in the tank, means electrically connected to the probe and responsive to the probe capacitance to generate a digital number proportional to said capacitance, memory means having a plurality of addressable memory locations each storing a respective predetermined number, and means connecting the memory means to receive said digital number as a memory location address code whereby the memory means outputs the said predetermined stored number corresponding to the addressed location, the output predetermined number bearing a predetermined relationship to the level of liquid in the tank.

According to the invention there is further provided a digital liquid-level gauging system, comprising a capacitive probe for insertion in a liquid storage tank and having a capacitance variable in dependence on the level of liquid in the tank, a pulse generator producing a pulse output and including timing circuitry into which the probe is connected, the capacitance of the probe determining the period of each cycle of the generator pulse output, an oscillator for generating count pulses, an electronic counter connected to receive said generator pulse output and to receive the count pulses, the counter repeatedly counting said count pulses for respective lengths of time dependent on the periodicity of the generator pulse output to produce respective accumulated counts, memory means having a plurality of addressable memory locations each storing a respective predetermined number, and means connecting the memory means to receive each said accumulated count as a memory location address code whereby the memory means outputs the said predetermined stored number corresponding to the addressed location, the stored numbers being indicative of the level of liquid in the tank.

BRIEF DESCRIPTION OF THE DRAWING

A digital liquid-level gauging system embodying the invention will now be described, by way of example, with reference to the accompanying drawing, the sole FIGURE of which is a block circuit diagram of the system.

DESCRIPTION OF THE PREFERRED EMBODIMENT

As shown in the FIGURE, the liquid-level gauging system comprises a capacitive probe 10 which forms part of a tank unit 12 arranged within a liquid-storage tank to measure the level of liquid in the tank. Variations in liquid level give rise to variations in the capacitance of the probe 10.

The probe 10 is electrically connected into timing circuitry of a pulse generator 14 such that the period of the output of the generator is directly proportional to the capacitance of the probe 10. The generator comprises an integrator 16 and a hysteresis switch 18.

The integrator 16, which forms the timing circuitry of the generator 14, comprises an operational amplifier 20 for which the probe 10 acts as a feedback element to determine the integration rate. The output of the amplifier 20 is connected through a resistor 22 of the hysteresis switch 18 to an input of a comparator 24 which is arranged to switch between high and low output states on transition of the voltage on its input through ground potential. The output of the comparator 24 is connected back to its input via a resistor 25 and is also connected via a fixed resistor 26 and a variable resistor 28 to the input of the amplifier 20.

The output of the comparator 24 also forms the output of the pulse generator 14 and is connected to a binary counter 30 such that the pulse output of the generator 14 gates the input of count pulses from a crystal oscillator 32 to the counter 30. The output of the counter 30 is connected to a latch 34 which is also connected to the output of the pulse generator 14. The latch 34 serves to hold the last count of the counter 30 and to feed this count to a programmable read-only memory (PROM) 36. The count held in the latch 34 is the memory address of the number which constitutes the desired digital output of the gauging system for the liquid level present in the tank.

If desired, a digital to analog converter 38 can be provided and connected to the memory 36 to give an analog liquid-level signal.

The operation of the gauging system will now be described.

The input of the integrator 16 is the pulse output of the hysteresis switch 18. With the output of the switch 18 low, the integrator 16 linearly integrates in a positive direction to produce a rising output voltage as indicated in the FIGURE. Integration in a positive direction continues until the potential of the junction of resistors 22 and 25 passes through ground potential at which point the output of the comparator 24 changes to high causing the direction of integration to reverse. Integration now occurs in a negative direction until the potential of the junction of resistors 22 and 25 again passes through ground potential and causes the output of the comparator 24 to change to low, completing one integration cycle. The integration cycle is repeated continuously and the output waveform of the generator 14 is thus a train of pulses, the periods of these pulses being directly proportional to the capacitance of the probe 10 and to the values of resistors 26 and 28. The variable resistor 28 permits the period of the output pulses of the generator 14 to be adjusted to be a particular value when the liquidstorage tank is empty.

The pulse output of the generator 14 gates the counter 30 to count pulses fed from crystal oscillator 32 during half of each cycle of the pulse output. The counter 30 thus accumulates a count proportional to the output frequency of the oscillator 32 and to the period of the output of the generator 14. Since the crystal oscillator output is constant in frequency, the count of the counter 30 is directly proportional to the output period of the generator 14 and thus to the capacitance of the probe 10.

After the completion of each count by the counter 30, the count is transferred to the latch 34 where it is held throughout the next cycle of the generator 14. In this manner, a digital signal corresponding to the probe capacitance is always available and does not alter during counting by the counter 30.

The number stored in the latch 34 is used as the address of that number stored in the memory 36 which is to form the memory output during the current period of the generator 14. Thus each address location in the memory 36 is programmed with a digital number that is the desired digital output for the digitized probe capacitance value corresponding to that address. Since any desired number can be stored in each memory location, the numbers stored can be tailored to give any desired relationship between memory input and output. Hence any non-linearity in the probe output can be compensated for by suitable programming of the memory 36.

The output of the memory 36 can be used as a digital representation of liquid level in further processing stages (such as a center-of-gravity control system for aircraft). The memory output can also be used to directly drive a digital-type display or can be converted by the converter 38 into an analog signal for use in driving other types of display.

The described digital capacitance gauging system can thus be seen to possess several advantages over conventional analog systems, these advantages including:

(a) an exact linear, temperature independent, response can be obtained;

(b) the read-only memory can be programmed to compensate for the differing characteristics of probes used with the system;

(c) direct interface with further, data processing, stages or with a digital display is possible;

(d) the read-only memory can be utilized for aircraft attitude corrections, thus reducing the complexity and expense of probes used in aircraft fuel tanks;

(e) the system can be modularized thus making it suitable for a wide variety of probe configurations with only a change in the read-only memory being required;

(f) less precision components are required than with analog systems and any required degree of accuracy can be obtained;

(g) small physical size.

What is claimed is:

1. A digital liquid-level gauging system, comprising: a capacitive probe for insertion in a liquid storage tank and having a capacitance variable in dependence on the level of liquid in the tank; a variable frequency generator including timing circuitry into which the probe is connected, the capacitance of the probe determining the period of each cycle of the generator output, in which the variable frequency generator comprises an integrator forming said timing circuitry and producing a voltage output changing at a rate determined by the probe capacitance, a hysteresis switch connected to receive the integrator output and to produce said generator output switching between high and low voltage levels on the integrator output reaching predetermined high and low values, and means connecting the generator output back to form the integrator input to reverse the direction of integration on said switching of the generator output; an oscillator for generating count pulses; and an electronic counter connected to be responsive to said generator output and to receive the count pulses from the oscillator, the counter repeatedly counting said count pulses for respective lengths of time dependent on the periodicity of the generator output to produce respective accumulated counts, each of which is directly proportional to the period of the generator output and thus a proportionate measure of the level of liquid in the tank.

2. A gauging system according to claim 1, comprising: memory means having a plurality of addressable memory locations each storing a respective predetermined number, and means connecting the memory means to receive each accumulated count as a memory location address code whereby the memory means outputs said predetermined stored number corresponding to the addressed location, the relationship between said accumulated counts and their corresponding predetermined numbers being such that the predetermined number output by the memory means is directly proportional to the level of liquid in the tank.

3. A gauging system according to claim 2, in which the said memory means is a programmable read-only memory.

4. A gauging system according to claim 1, which further comprises latch means, arranged to receive each accumulated count, for storing said count until receipt of the next count.

5. A gauging system according to claim 2, comprising a digital to analog converter connected to receive said predetermined number and to output an analog signal of magnitude proportional to the predetermined number.

6. A gauging system according to claim 1, in which the integrator comprises:
- a voltage amplifier having an input and an output between which the probe is electrically connected to provide a capacitive feedback element for the amplifier, and
- resistor means connected to the amplifier input and arranged to receive said generator output, the resistor means being adjustable in resistance to enable a desired integration rate to be set to correspond to the condition when the tank is empty of liquid.

7. A gauging system according to claim 6, in which the hysteresis switch comprises:
- a voltage comparator having an input and an output,
- a first resistor connected between the input and output of the comparator, and
- a second resistor connected between the said output of the integrator amplifier and the input of the comparator, whereby the comparator switches between high and low output states as the voltage at its input passes through a fixed level.

8. A digital liquid-level gauging system, comprising:
- a capacitive probe for insertion in a liquid storage tank and having a capacitance variable in dependence on the level of liquid in the tank,
- means electrically connected to the probe and responsive to the probe capacitance to generate a signal proportional to said capacitance,
- memory means having a plurality of addressable memory locations each storing a respective predetermined number, and
- means connecting the memory means to receive said digital number as a memory location address code whereby the memory means outputs the said predetermined stored number corresponding to the addressed location, the output predetermined number bearing a predetermined relationship to the level of liquid in the tank.

9. A gauging system according to claim 8, in which the said memory means is a programmable read-only memory.

10. A digital liquid-level gauging system, comprising:
- a capacitive probe for insertion in a liquid storage tank and having a capacitance variable in dependence on the level of liquid in the tank,
- a pulse generator producing a pulse output and including timing circuitry into which the probe is connected, the capacitance of the probe determining the period of each cycle of the generator pulse output,
- an oscillator for generating count pulses, and
- an electric counter connected to receive said generator pulse output and to receive the count pulses, the counter repeatedly counting said count pulses for respective lengths of time dependent on the periodicity of the generator pulse output to produce representative accumulated counts, which are directly proportional to the period of the generator output, and thus a proportionate measure of the level of liquid in the tank 11. A gauging system according to claim 10, which further comprises:
- memory means having a plurality of addressable memory locations each storing a respective predetermined number, and
- means connecting the memory means to receive each said accumulated count as a memory location address code whereby the memory means outputs the said predetermined stored number corresponding to the addressed location, the stored numbers being indicative of the level of liquid in the tank.

* * * * *